(12) United States Patent
Tashiro

(10) Patent No.: US 7,570,718 B2
(45) Date of Patent: Aug. 4, 2009

(54) DEVICE AND METHOD FOR WIRELESS COMMUNICATION AND COMPUTER PROGRAM

(75) Inventor: Shinsuke Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 11/285,005

(22) Filed: Nov. 23, 2005

(65) Prior Publication Data

US 2006/0140310 A1    Jun. 29, 2006

(30) Foreign Application Priority Data

Nov. 26, 2004    (JP)    ............................ P2004-342942

(51) Int. Cl.
*H04L 27/00*    (2006.01)
(52) U.S. Cl. ...................... 375/326; 316/327; 316/373; 316/376
(58) Field of Classification Search ................ 375/326, 375/316, 327, 373, 376
See application file for complete search history.

(56) References Cited

U.S. PATENT DOCUMENTS

| 5,594,758 | A  | * | 1/1997 | Petranovich | ................. 375/344 |
| 6,751,270 | B1 | * | 6/2004 | Choi et al. | ................. 375/326 |
| 6,968,021 | B1 | * | 11/2005 | White et al. | ................. 375/340 |
| 7,289,765 | B2 | * | 10/2007 | Okada et al. | ................. 455/45 |

* cited by examiner

*Primary Examiner*—Ted Wang
(74) *Attorney, Agent, or Firm*—Oblon, Spivak, McClelland, Maier & Neustadt, P.C.

(57) ABSTRACT

Disclosed herein is a wireless communication device which includes an RF processing unit and a baseband unit that carries out carrier tracking based on a signal after RF processing, in which the device includes: a phase error measuring means that measures a phase error estimation value composed of the phase error value of a carrier and the direction thereof; and a phase error correcting means that compares a phase error estimation value with a first threshold value and a second threshold value larger than the first threshold value, and carries out a first or a second phase error correcting process in response to that a phase error estimation value has exceeded the first or second threshold value.

10 Claims, 11 Drawing Sheets

DEVICE AND METHOD FOR WIRELESS COMMUNICATION AND COMPUTER PROGRAM

CROSS REFERENCES TO RELATED APPLICATIONS

The present invention contains subject matter related to Japanese Patent Application No. 2004-342942 filed in the Japanese Patent Office on Nov. 26, 2004, the entire contents of which being incorporated herein by reference.

BACKGROUND OF THE INVENTION

1. Field of the Invention

The present invention relates to a device and a method for wireless communication and a computer program wherein communication is carried out among multiple wireless stations as in wireless LAN (Local Area Network) or PAN (Personal Area Network). In particular, it relates to a device and a method for wireless communication and a computer program wherein data transmission is carried out by an ultra wideband system.

In more particular, the present invention relates to a device and a method for wireless communication and a computer program wherein highly accurate carrier tracking can be carried out. In further particular, it relates to a device and a method for wireless communication and a computer program wherein highly accurate carrier tracking is implemented by simpler RF circuitry.

2. Description of Related Art

WPAN (Wireless Personal Access Network) for near field communication, typified by UWB, is expected to be mounted in every household appliance and CE (Consumer Electronics) equipment in the future. Realization of P-to-P transmission at over 100 Mbps between pieces of CE equipment and home networking is anticipated. When the utilization of millimeter-wave band becomes widespread, short-range wireless communication at over 1 Gbps also becomes feasible. Ultrahigh-speed DANs (Device Area Network) for short ranges, involving storage devices and the like can also be implemented.

In recent times, wireless LAN systems to which the SS (Spread Spectrum) system is applied have become commercially practical. With use of spread spectrum, the C/I required for normal communication can be set to a level lower than 0 dB even if there is nearby any communication using the same frequency. That is, even if any other user's signal is detected at the same level as one user's signal, the one user can still carry out communication. In particular, in case of UWB, the occupied bandwidth is originally much wider than the required bit rate, and thus the SS communication method can be easily used.

The DS (Direct Spread) system is a type of the SS system. In this system, the following operation is performed: at the transmitting end, an information signal is multiplied by a random code sequence called PN (Pseudo Noise) code. Thus, the occupied band is spread and the signal is transmitted. At the receiving end, the received spread information signal is multiplied by PN code and thereby de-spread to reproduce the information signal.

There are two types of UWB transmission method, DS-UWB method and impulse-UWB method. In the DS-UWB method, the rate of spread of a DS information signal is enhanced to the maximum. In the impulse-UWB method, an impulse signal sequence having as very short a period as several hundred picoseconds or so is used to compose an information signal and this signal sequence is transmitted and received.

In the DS-UWB method, a spectrum can be controlled by PN code rate. However, this method has a problem. Since it may be required to operate a logic circuit at a high speed of the order of gigahertz, the power consumption is prone to be increased. The impulse-UWB method can be implemented by a combination of a pulse generator and a low-speed logic circuit; therefore, it brings an advantage of reduced consumption current. However, this method also has a problem. It is difficult to control a spectrum with a pulse generator.

With either method, high-speed data transmission can be implemented by spreading a signal over an ultra wide frequency band, for example, from 3 GHz to 10 GHz when the signal is transmitted and received. The occupied bandwidth is such a band of the order of gigahertz that the value obtained by dividing the occupied bandwidth by its center frequency (e.g., 1 GHz to 10 GHz) is substantially 1. This is an ultra wide frequency band even as compared with bandwidths commonly used in wireless LAN using the so-called W-CDMA and cdma2000 systems and the SS (Spread Spectrum) and OFDM (Orthogonal Frequency Division Multiplexing) systems.

There is proposed a communication device that transmits and receives a signal by pulse to avoid a problem of spectrum in the UWB communication system. (Refer to Patent Document 1, for example.) In this case, when a carrier wave is generated, the center frequency of transmission band is set to 7.5 GHz, bypassing 3 GHz or below, which is the FCC's specification for spectrum mask, and the 5 GHz band, which is used in existing wireless LAN systems. A baseband pulse is generated at time intervals equivalent to an integral submultiple of this frequency. The baseband pulse is formed as a rectangular wave whose length is equivalent to an integral multiple of one period of the carrier wave. Subsequently, the baseband pulse is frequency modulated by the carrier wave to generate a three-cycle pulse.

In such a case, 3 GHz or below and 5 GHz have substantially no energy from the beginning. Therefore, even in consideration of the FCC rules and existing communication systems using the 5 GHz band, the pulse waveform does not lose accuracy so much and energy is not lost so much. The ratio of bandwidth is lowered, and as a result, designing of antennas and RF circuits is significantly facilitated.

Wireless communication has a problem. The phase of a received signal is rotated under the influence of propagation path, such as multipath. For this reason, it may be required for a wireless receiver to carry out carrier tracking and correct the phase so that the optimum amount of phase rotation is obtained.

There is disclosed a phase rotation unit in which the method for carrier tracking differs between in cases where the transmission rate is higher than the upper-limit speed of an A-D converter and in cases where it is lower. (Refer to Patent Document 1, for example.)

More specific description will be given. In case of a transmission rate lower than the upper-limit operation speed of an A-D converter, the square values of sampled values are averaged to determine a phase shift. Then, operation is performed to return the phase by an amount equivalent to this phase shift. This is equivalent to that the rotation is corrected based on the estimation of propagation path. Therefore, high accuracy is achieved though there is restriction on speed.

In case of a transmission rate higher than the upper-limit speed of an A-D converter, template matching is carried out. In this operation, previously computed values shifted in phase by 45 degrees from the I-axis component and the Q-axis component of a received signal are passed through a simple comparator. An output from the comparator equivalent to a shift closest to the phase shift computed from a sampled value is selected, and it is taken as a value after carrier tracking.

However, this construction of a phase rotation unit has a problem. The computation of the square of a sampled value is involved, and there is apprehension that the scale of circuitry may be increased when it is incorporated into a digital circuit. In case the transmission rate is higher than the upper-limit speed of an A-D converter, a problem can arise when carrier tracking is carried out with an accuracy of 45 degrees. Half of electric power at the maximum can be lost after tracking, and this is inefficient.

[Patent Document 1] Japanese Unexamined Patent Publication No. 2004-159196

[Non-patent Document 1] International Standard ISO/IEC 8802-11: 1999(E) ANSI/IEEE Std 802.11, 1999 Edition, Part 11: Wireless LAN Medium Access Control (MAC) and Physical Layer (PHY) Specifications

[Non-patent Document 2] ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-patent Document 3] ETSI TS 101 761-2 V1.3.1 Broadband Radio Access Networks (BRAN); HIPERLAN Type 2; Data Link Control (DLC) Layer; Part 2: Radio Link Control (RLC) sublayer

[Non-patent Document 4] "Ultra Wideband—A Revolutionary in Radio Transmission Giving Its First Cry," the Nikkei Electronics, Mar. 11, 2002, pp. 55-66

SUMMARY OF THE INVENTION

There is a need for an excellent wireless communication device, wireless communication method, and computer program wherein highly accurate carrier tracking can be implemented.

There is also a need for an excellent wireless communication device, wireless communication method, and computer program wherein highly accurate carrier tracking can be implemented with simpler RF circuitry.

The present invention has been made with the foregoing taken into account. According to an embodiment of the present invention, there is provided a wireless communication device that includes an RF processing unit and a baseband processing unit that carries out carrier tracking based on a signal after RF processing. The wireless communication device includes the following:

a phase error measuring means that measures a phase error estimation value composed of the phase error value of a carrier and its direction; and a phase error correcting means that compares a phase error estimation value with a first threshold value and a second threshold value higher than the first threshold value, and carries out a first or a second phase error correcting process, respectively, in response to that the phase error estimation value has exceeded the first or the second threshold value.

A wireless communication device according to the embodiment of the present invention further includes a propagation path estimating unit that estimates a propagation path based on a signal after RF processing. The phase error correcting means can correct a relatively small carrier phase error by performing the following operation: it rotates a propagation path estimation value by a predetermined value in the direction opposite the phase error in response to that the phase error estimation value has exceeded the first threshold value.

The wireless communication device according to the embodiment of the present invention further includes a RAKE synthesis unit that carries out RAKE reception based on the result of measurement by the propagation path estimating unit. The phase error correcting means can obtain a phase error estimation value ($P_{err\_I}$, $P_{err\_q}$) on the IQ plane by performing the following operation: it maps the RAKE reception result, obtained by integrating the I-axis and Q-axis components, onto the IQ plane until the data output of RAKE synthesis is finalized. In such a case, the phase error correcting means can correct a relatively small carrier phase error by performing the following operation: it rotates a phase error estimation value ($P_{err\_I}$, $P_{err\_q}$) on the IQ plane by a predetermined value in the direction opposite the phase error in response to that the phase error estimation value has exceeded the first threshold value.

The phase error correcting means is so constructed that it corrects a relatively large carrier phase error by performing the following operation: it carries out the second phase error correcting process in response to that the sum of the amounts of correction carried out because the phase error estimation value has exceeded the first threshold value has exceeded the second threshold value.

Specifically, the phase error correcting means outputs a phase shift command to the RF processing unit in response to that a phase error estimation value has exceeded the second threshold value. The RF processing unit corrects a relatively large carrier phase error through phase shift by the RF processing unit by performing the following operation: it corrects the chip position of a carrier signal by a predetermined amount in the direction opposite the phase shift in response to the phase shift command.

Wireless communication has a problem. The phase of a received signal is rotated under the influence of propagation path, such as multipath. For this reason, it may be required for a wireless receiver to carry out carrier tracking and correct the phase so that the optimum amount of phase rotation is obtained.

According to the embodiment of the present invention, highly accurate carrier tracking can be implemented. Most of carrier tracking processes can be performed with a baseband processing unit constructed of a digital circuit. Therefore, it may be unnecessary to carry out carrier frequency control in an RF circuit.

According to the embodiment of the present invention, carrier tracking is carried out by changing the timing of A-D conversion in an RF circuit when a phase error is large. Therefore, such a highly accurate oscillator as VC-TCXO (Voltage Controlled-Temperature Compensated Crystal Oscillator) may not be required. As a result, an RF circuit can be more simply incorporated into a receiver, and further reduction in power consumption can be accomplished.

According to another embodiment of the present invention, there is provided a computer program written in a computer-readable format so as to perform baseband processing on a digital signal after RF processing on a computer system. The program includes the following steps:

a phase error measurement step in which a phase error estimation value composed of the phase error value of a carrier and its direction is measured;

a first phase error correction step in which a phase error estimation value is compared with a first threshold value, and a first phase error correcting process is carried out in response to that the phase error estimation value has exceeded the first threshold value; and a second phase error correction step in which a phase error estimation value is compared with a second threshold value larger than the first threshold value, and a second phase error correcting process is carried out in response to that the phase error estimation value has exceeded the second threshold value.

A computer program according to the another embodiment of the present invention is defined as a computer program written in a computer-readable format so as to implement predetermined processing on a computer system. In other words, a synergetic action is exerted on a computer system by installing a computer program according to the another embodiment of the present invention onto the computer system. Thus, the same action and effect as with a wireless communication device according to the above-mentioned embodiment of the present invention can be obtained.

According to an embodiment of the present invention, it may be possible to provide an excellent wireless communication device, wireless communication method, and computer program wherein highly accurate carrier tracking can be implemented.

According to another embodiment of the present invention, it may be possible to provide an excellent wireless communication device, wireless communication method, and computer program wherein highly accurate carrier tracking is implemented with simpler RF circuitry.

These and other objects, features, and advantages of the present invention will become apparent from embodiments of the present invention described later and more detailed description based on the accompanying drawings.

BRIEF DESCRIPTION OF THE DRAWINGS

Embodiments of the present invention will be described in detail based on the following figures, wherein.

DETAILED DESCRIPTION OF THE PREFERRED EMBODIMENTS

Hereafter, detailed description will be given to embodiments of the present invention with reference to the drawings.

Figure 1:
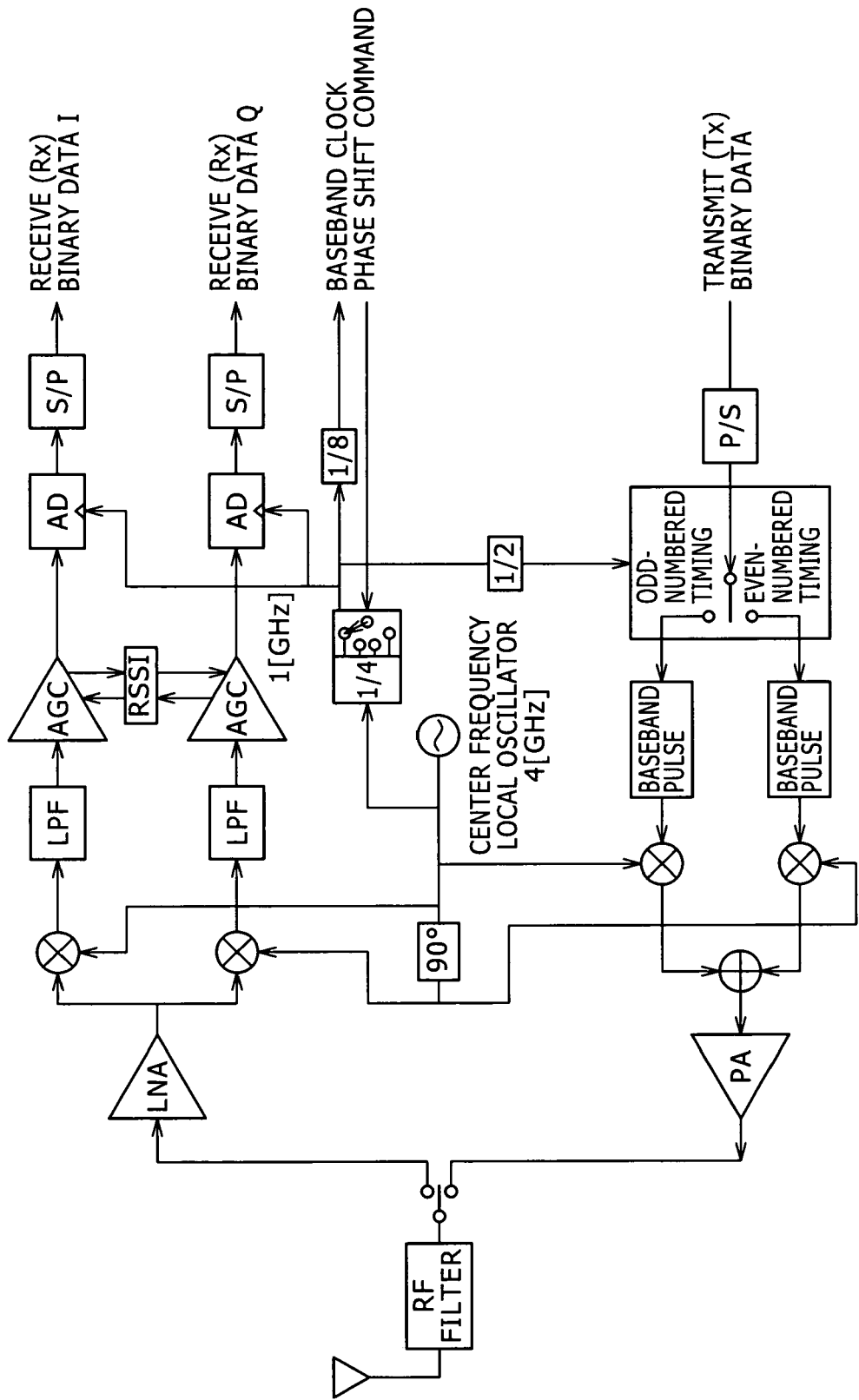
FIG. 1 is a drawing schematically illustrating the configuration of the RF processing unit in a wireless communication device according to an embodiment of the present invention.

FIG. 1 schematically illustrates the configuration of the RF processing unit in a wireless communication device according to an embodiment of the present invention. The illustrated RF processing unit is a typical transmitter-receiver of $\pi/2$-shift BPSK. It is so constructed that the phase of sampling frequency of 1 GHz can be changed in four levels by a control signal from the baseband side after A-D conversion.

Figure 2:
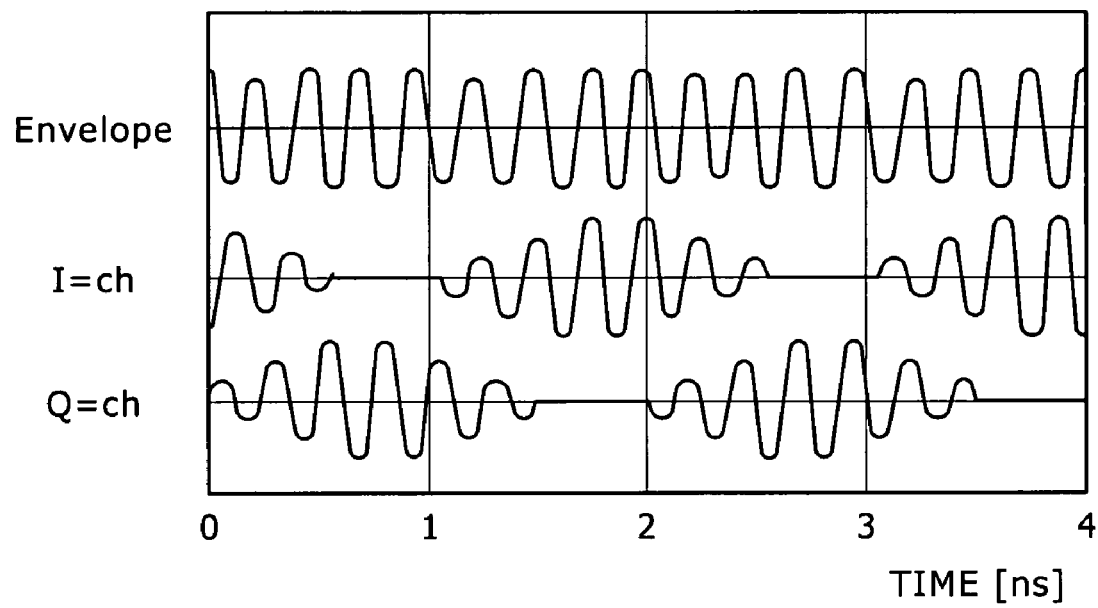
FIG. 2 is a drawing depicting an image of the signal waveform of an I-channel and a Q-channel signal having a phase difference of 90 degrees and the signal waveform after multiplication (envelope)

In the transmission system, the following operation is performed: a transmitted signal sent from a baseband processing unit (not shown in FIG. 1) is converted from parallel to serial. Then, it is alternately divided into odd-numbered timing and even-numbered timing with timing of 500 MHz, and thereby pulse shaped. They are respectively BPSK modulated by 4 GHz carriers orthogonal to each other, and added together. The obtained signal is amplified through a power amplifier, and is wirelessly transmitted from an antenna through an RF filter. FIG. 2 illustrates an image of the signal waveform of an I-channel and a Q-channel signal having a phase difference of 90 degrees and the signal waveform after multiplication (envelope).

In the reception system, the following operation is performed: a radio signal received by the antenna is passed through the RF filter and a low-noise amplifier. Quadrature detection is carried out by synthesizing frequencies using a center frequency signal of 4 GHz and a frequency signal having a phase difference of 90 degrees therefrom. The signal is thereby separated into an I-channel signal and a Q-channel signal, and they are respectively subjected to AGC based on RSSI (received signal field strength). The signals are sampled as digital signals at intervals of 1 GHz by A-D converters. The sampled I/Q signals are further converted from serial to parallel. The subsequent processing is digitally carried out by the baseband processing unit.

A local frequency of 4 GHz generated by a local oscillator is used as a carrier frequency in the RF processing unit.

Also, this carrier frequency is divided into 1/4, and is supplied as a sample rate for the A-D converters, that is, a chip rate of 1 GHz.

The chip rate of 1 GHz is further divided into 1/8, and is supplied as a clock frequency of 125 MHz for the baseband processing unit (described later).

The clock frequency for the baseband processing unit can be selected from among operation speeds that are an integral submultiple of a chip rate and can be accomplished in processes. In a normal receiver of the spread spectrum (SS) system, its baseband processing unit can be operated at the same clock frequency as a chip rate. In the UWB system, however, the same clock frequency as a chip rate excessively increases power consumption; therefore, an integral submultiple of a chip rate is taken as the clock frequency.

The oscillator includes a mechanism for changing the chip timing, that is, the phase in chip from 0/4 to 2/4 in response to a phase shift command (PhaseShift) from the baseband processing unit. Thus, the phase of the RF processing unit can be shifted.

Figure 3:
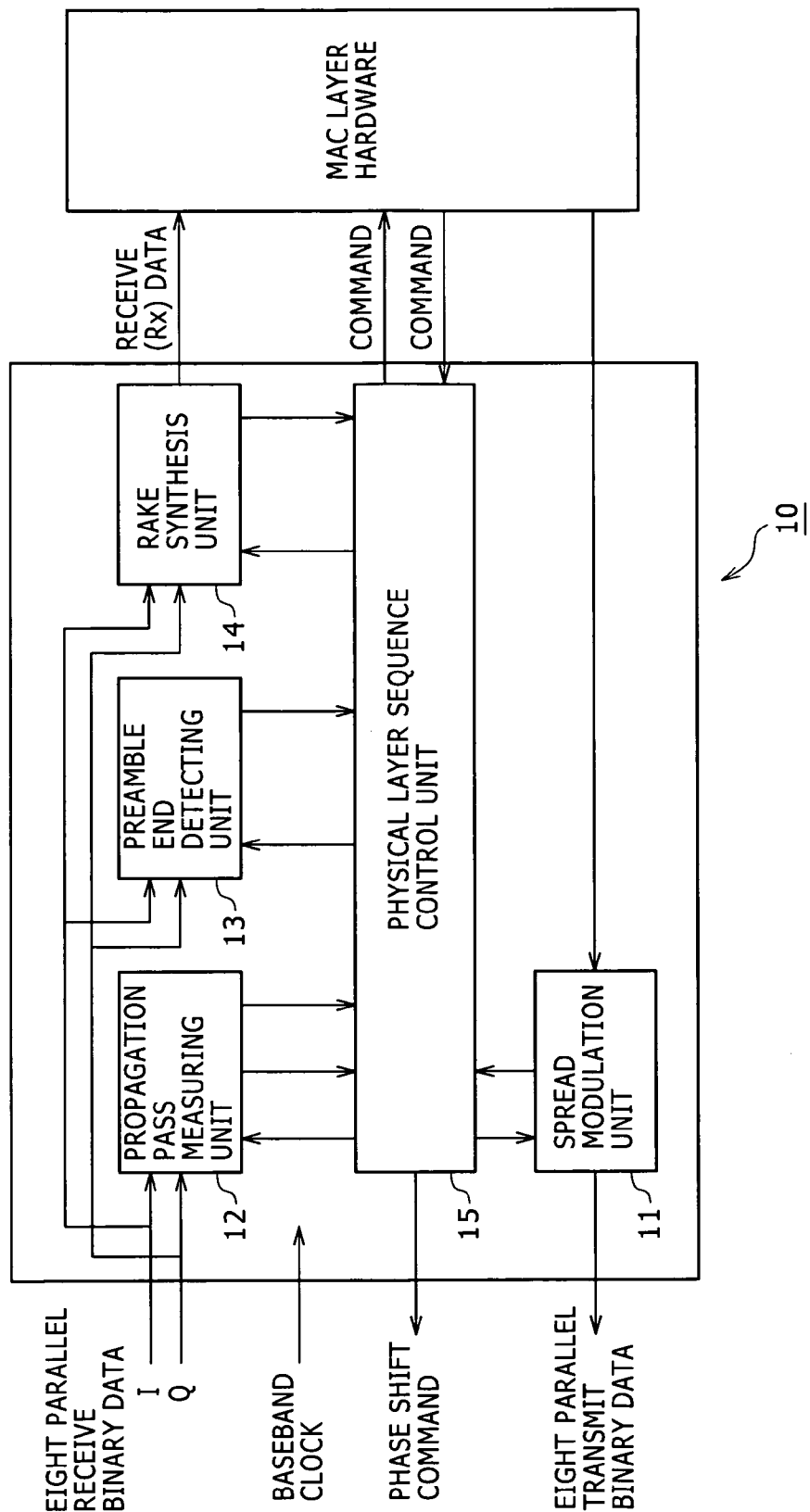
FIG. 3 is a drawing schematically illustrating the configuration of the baseband processing unit in a wireless communication device according to an embodiment of the present invention.

FIG. 3 schematically illustrates the configuration of the baseband processing unit in a wireless communication device according to an embodiment of the present invention. The baseband processing unit 10 illustrated in the figure includes a spread modulation unit (Direct Spreader) 11 that spreads an information signal, for the transmission system. It includes the following for the reception system: a propagation path measuring unit (Channel Measure) 12 that measures the delay profile of a propagation path; a preamble end detecting unit (PreambleEndDetect) 13 that detects the end of a preamble signal; and a RAKE synthesis unit 14 that RAKE synthesizes the energy of a multipath signal to demodulate a signal. These functional circuit portions in the transmission and reception systems are controlled by a physical layer sequence control unit (PhySequenceControl) 15 in a centralized manner.

In the transmission system of this baseband processing unit 10, a transmitted signal sent from a MAC layer circuit equivalent to its higher-level layer in a communication protocol is subjected to direct spread by the spread modulation unit 11, and sent out to the transmission system of the RF processing unit. The signal processing procedure in the reception system of the baseband processing unit 10 will be described later.

In this embodiment, a carrier tracking block is placed in the physical layer sequence control unit 15. The configuration and operation of the carrier tracking block will be described in detail later.

Figure 4:
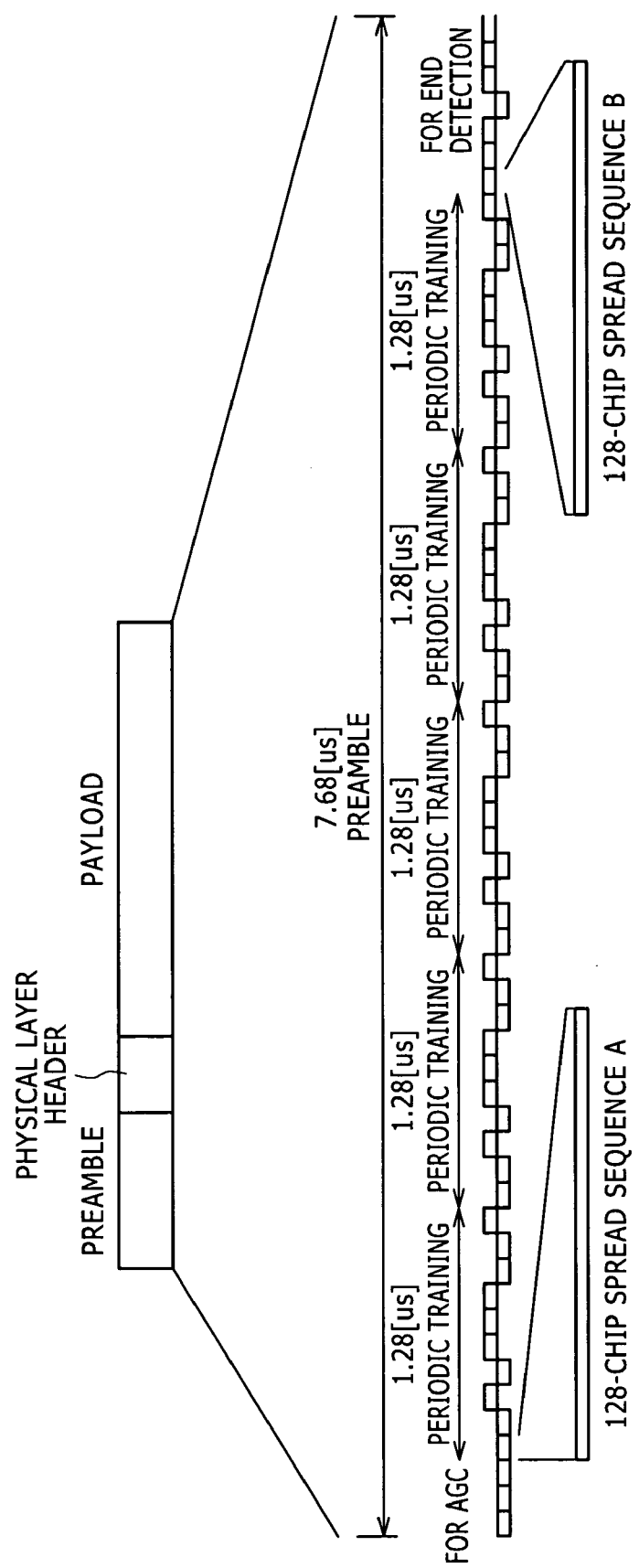
FIG. 4 is a drawing schematically illustrating an example of the format construction of a signal used in wireless transfer in an embodiment of the present invention.

FIG. 4 schematically illustrates an example of the format construction of a signal used in wireless transfer in an embodiment of the present invention.

As illustrated in the figure, a transmitted signal is constructed of: a preamble portion for carrying out such processing as signal detection and synchronization; a PHY header portion in which control information for the PHY layer is described; and a payload portion. The payload portion can be further divided into a MAC header portion and a MAC payload portion. However, these portions are not directly related to the subject matter of the present invention, and the description thereof will be omitted here.

The preamble portion is constructed of a short code pattern (Spread Sequence) including 128 chips. In this embodiment, two short code patterns A and B, excellent in self correlation characteristic, are provided.

At the head of the preamble portion, the pattern B is repeated more than once, and it is used as a region for stabilizing gain in AGC. In the example illustrated in FIG. 4, the pattern B is repeated only three times for AGC. However, it may be required to ensure the region equivalent to the period in which AGC is stabilized.

Following the region for AGC, a training pattern for propagation path measurement, constructed using the pattern A equivalent to 10 symbols, is so disposed that it is repeated only five times.

Following the training patterns, a pattern for preamble end detection, constructed using seven pieces of the pattern B, is placed.

However, the subject matter of the present invention is not limited to the format construction illustrated in FIG. 4, and parameter values and the like that constitute each pattern may be varied as appropriate.

Figure 5:
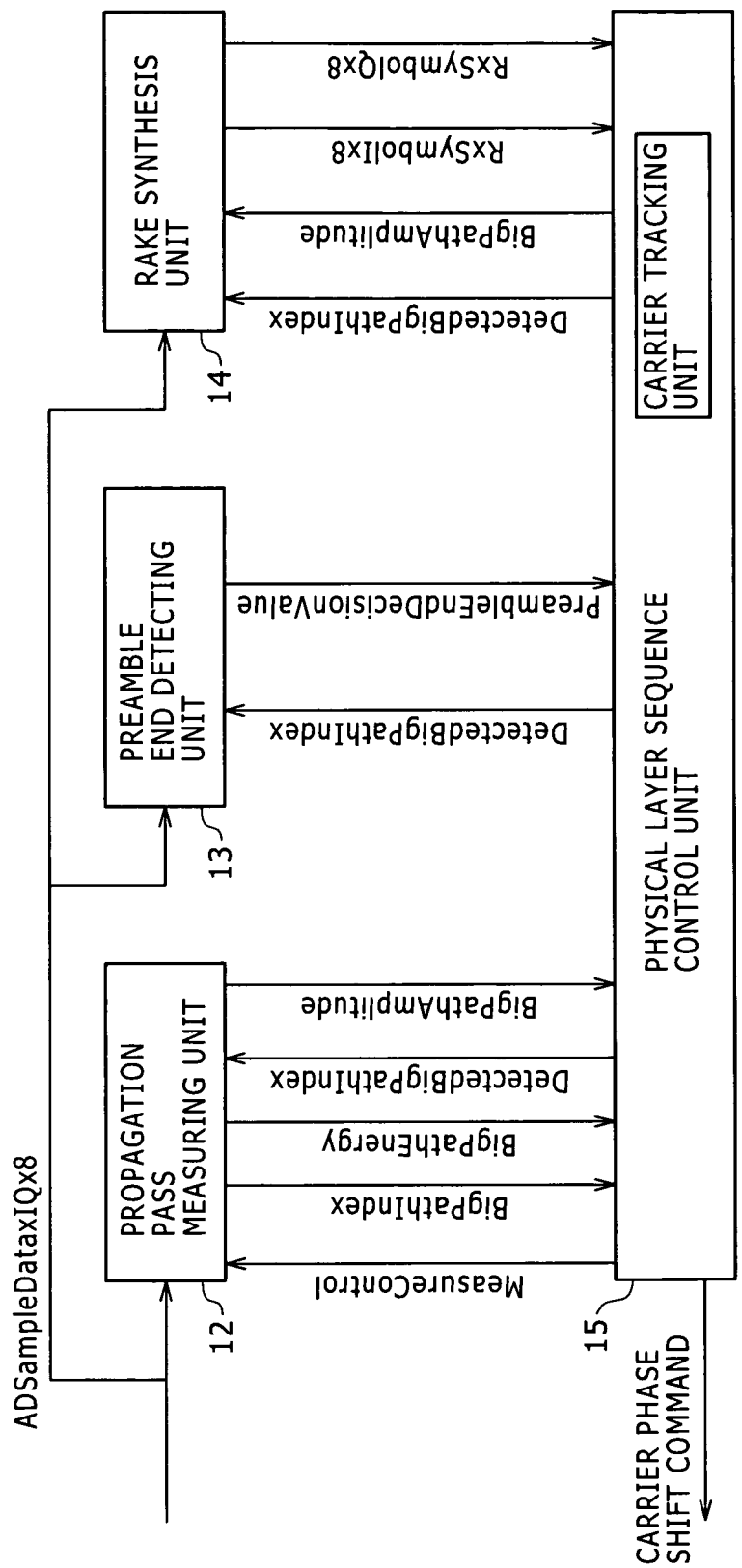
FIG. 5 is a drawing illustrating the configuration of the reception system, illustrated in FIG. 3, in more detail.

FIG. 5 illustrates the configuration of the reception system of the baseband processing unit, illustrated in FIG. 3, in more detail. The reception system includes: the propagation path measuring unit (Channel Measure) 12 that measures the delay profile of a propagation path; the preamble end detecting unit (PreambleEndDetect) 13 that detects the end of a preamble signal; and the RAKE synthesis unit 14 that RAKE synthesizes the energy of a multipath signal to demodulate a signal. These portions are controlled by the physical layer sequence control unit (PhySewquenceControl) 15 in a centralized manner.

The following description is on the assumption that the carrier frequency for the RF processing unit is 4 GHz, the sample rate, that is, the chip rate for A-D conversion is 1 GHz, and the clock frequency of the baseband processing unit is 125 MHz.

The clock frequency of the baseband processing unit 10 can be selected from among operation speeds that are an integral submultiple of a chip rate and can be accomplished in processes. In this embodiment, the clock frequency of 125 MHz is equivalent to 1/8 of the chip rate of 1 GHz. In a normal receiver of the spread spectrum (SS) system, its baseband processing unit can be operated at the same clock frequency as a chip rate. In the UWB system, however, the same clock frequency as a chip rate excessively increases power consumption; therefore, an integral submultiple of a chip rate is taken as the clock frequency.

A preamble signal received by the RF processing unit is subjected to quadrature detection using a carrier frequency of 4 GHz and a frequency having a phase difference of 90 degrees therefrom, and is thereby separated into an I-channel signal and a Q-channel signal. These signals are converted into digital signals through the A-D converters, and then inputted to the propagation path measuring unit (ChannelMeasure) 12. The delay profile of the propagation path is measured there.

In a normal receiver of the spread spectrum (SS) system, its baseband processing unit can be operated at the same clock frequency of a chip rate. In this case, propagation path measurement can be carried out by performing sliding correlation. In the UWB system, however, an integral submultiple of a chip rate is taken as baseband clock because the same clock frequency as a chip rate excessively increases power consumption (mentioned above). Therefore, it may be impossible to carry out propagation path measurement utilizing sliding correlation.

For this reason, the propagation path measuring unit in this embodiment carries out propagation path measurement by performing de-spread with respect to each short code. The interval measured is 128 nanoseconds=128 (the number of chips of short code)×1 nanosecond (chip rate).

The propagation path measuring unit 12 measures propagation paths in response to a propagation path measurement command (MeasureControl) from the physical layer sequence control unit 15. It selects a predetermined number of paths high in signal level from among those at 128 points, and outputs each position (BigPathIndex) and energy value (BigPathEnergy) to the physical layer sequence control unit.

When the physical layer sequence control unit 15 detects the signals, it terminates propagation path measurement, and passes the position of the path in which the maximum energy was detected (Index) to the preamble end detecting unit 13. The preamble end detecting unit 13 detects a signal indicating the end of preamble with respect to this maximum path, and sends this value (PreambleEndDetectDecisionValue) back to the physical layer sequence control unit 15. The physical layer sequence control unit 15 determines the end of preamble using PreambleEndDetectDecisionValue.

One of problems associated with the transmission and reception of a radio signal is multipath fading. This is a phenomenon in which the following takes place: a communication radio wave is reflected by a building or other like objects and it arrives at a receiving end through different paths; radio waves arriving from different directions interfere with one another, and the received signal is distorted.

RAKE reception means that more than one radio wave is received. A desired signal is separated from a received signal in which multiple delayed waves superpose because of multipath propagation paths, by de-spread processing, and dispersed signal power is thereby concentrated. That is, direct spread spectrum's effect of time resolving by de-spread is utilized, and the separated signals in respective paths are synthesized with time and phase matched. (For example, the signals are subjected to maximum ratio combining with weights assigned according to the S/N ratios of the paths.) With RAKE reception, desire signal temporally dispersed can be effectively synthesized.

In this embodiment, soon after the end of preamble is detected by the above-mentioned operation, the main body of data (i.e., PHY header and payload) arrives. Timed with this, the physical layer sequence control unit 15 causes the RAKE synthesis unit 14 to set a propagation path complex amplitude value and a spreading ratio with respect to each of N paths and start RAKE synthesis. The I-axis component of the output of the RAKE synthesis unit as a received symbol is taken as demodulated data.

Figure 6:
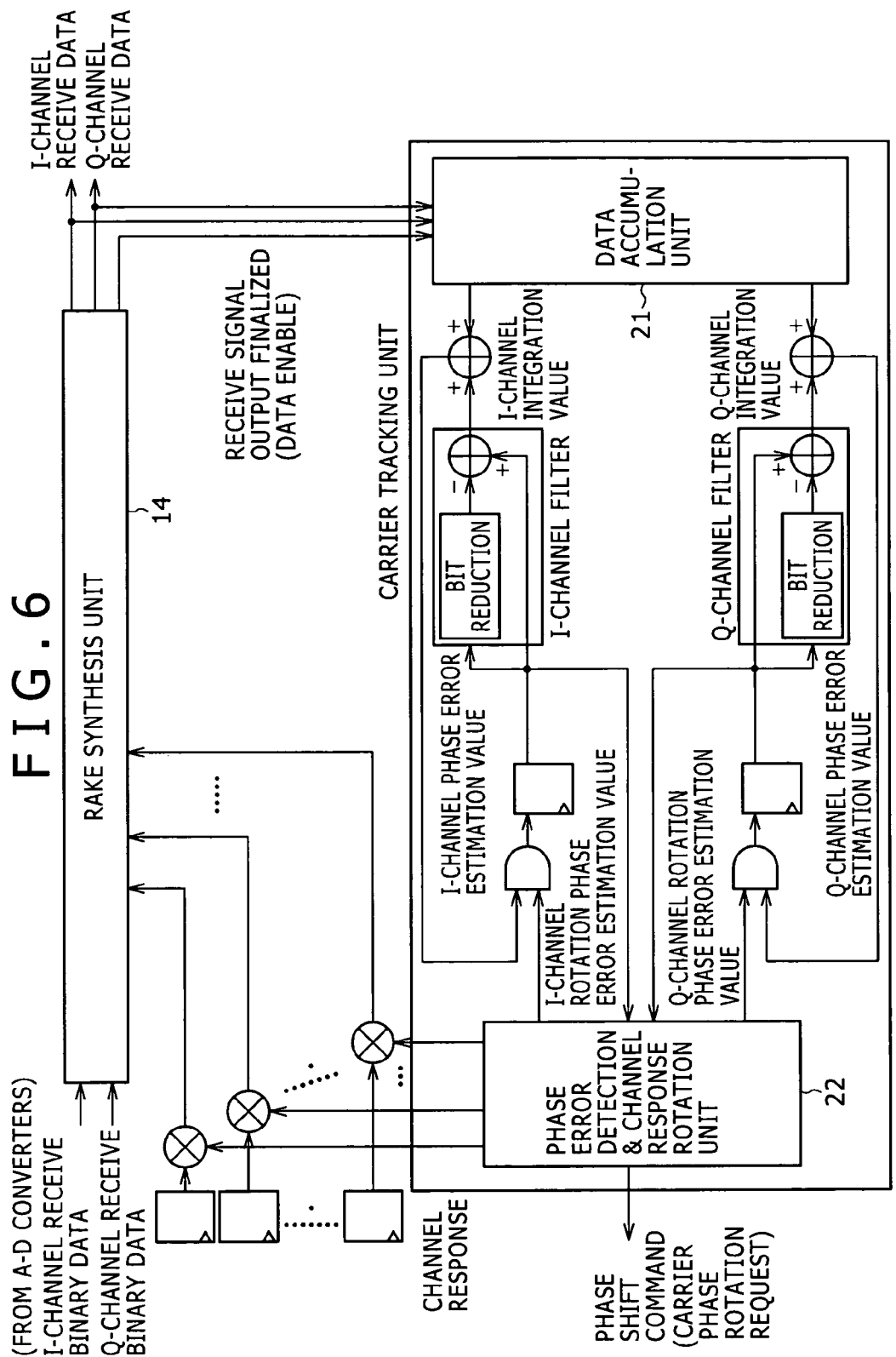
FIG. 6 is a drawing illustrating the configuration of the carrier tracking unit in a physical layer sequence control unit.

According to this embodiment, as mentioned above, carrier tracking is carried out in the physical layer sequence control unit 15. FIG. 6 illustrates the configuration of its carrier tracking unit.

The output of the RAKE synthesis unit 14 is sent out as receive data of I-channel and Q-channel to the next stage (not shown). At the same time, it is returned to the physical layer sequence control unit 15 to detect the carrier phase shift between the axis components.

In the data accumulation unit (Data Accumuration) 21 in the physical layer sequence control unit 15, data is added until when the output of the RAKE synthesis unit 14 is finalized. (That is, it is added until a data enable signal is outputted from the RAKE synthesis unit.)

Figure 7:
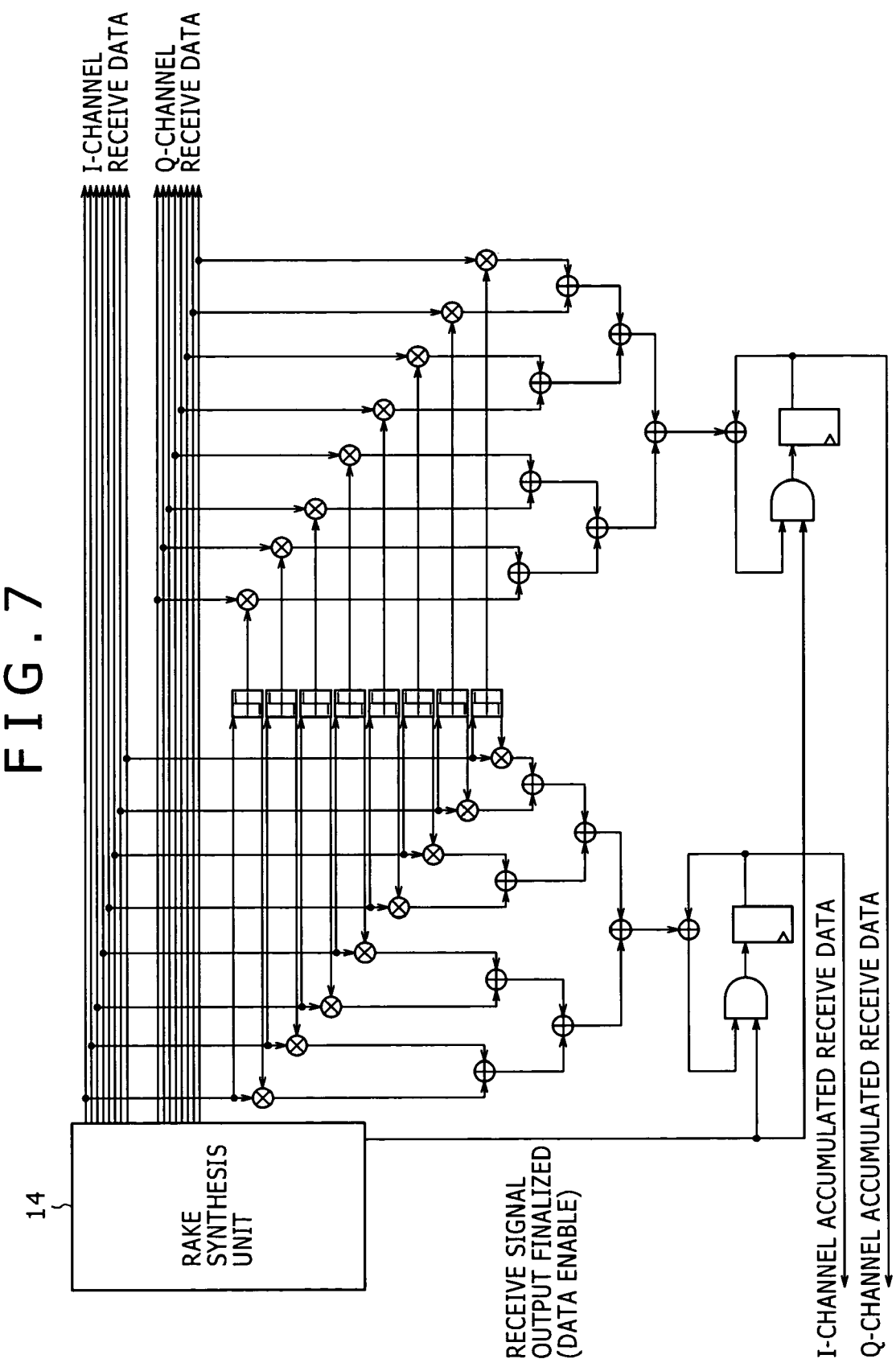
FIG. 7 is a drawing illustrating circuitry for adding the I-axis and Q-axis components in a data accumulation unit 21.
Figure 8:
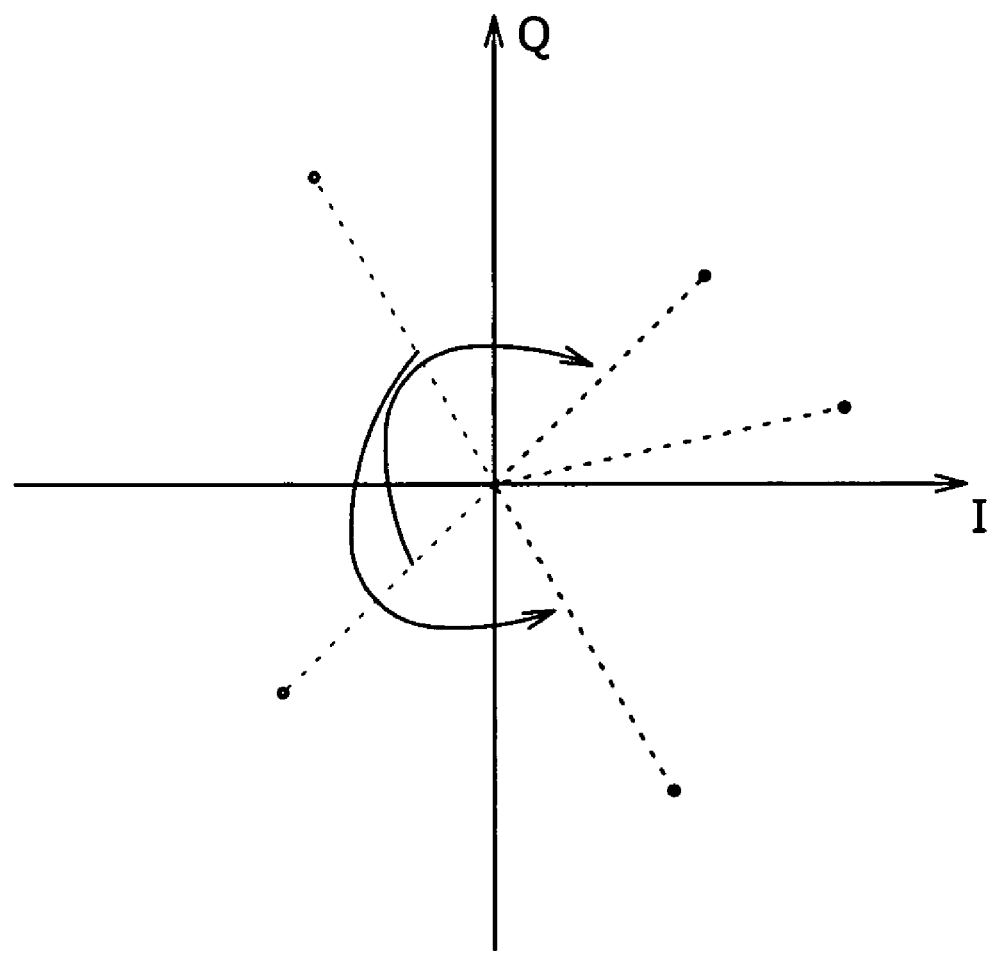
FIG. 8 is a drawing showing the operation of adding the I-axis and Q-axis components on the IQ plane.

FIG. 7 illustrates circuitry for adding the I-axis and Q-axis components in the data accumulation unit 21. As illustrated in the figure, for the I-axis component of RAKE synthesis output, its absolute values are added. For the Q-axis component, the following procedure is taken: when the polarity of the corresponding I-axis component is negative, the polarity is inverted before its values are added. FIG. 8 illustrates the operation of adding the I-axis and Q-axis components on the IQ plane. As illustrated in the figure, the operation is performed in correspondence with that all the receive signal points are gathered on the plane of I>0.

A phase error detection & channel response rotation unit 22 supplies the phase error estimation values of the I-axis and Q-axis components, that is, $(P_{err\_I}, P_{err\_q})$. The integration values of the I-axis and Q-axis components in the data accumulation unit 21 is outputted in accordance with the next ticking of the clock of the data enable signal from the RAKE synthesis unit 15. Then, they are added together with the phase error estimation value $(P_{err\_I}, P_{err\_q})$ after filter passage.

Figure 9:
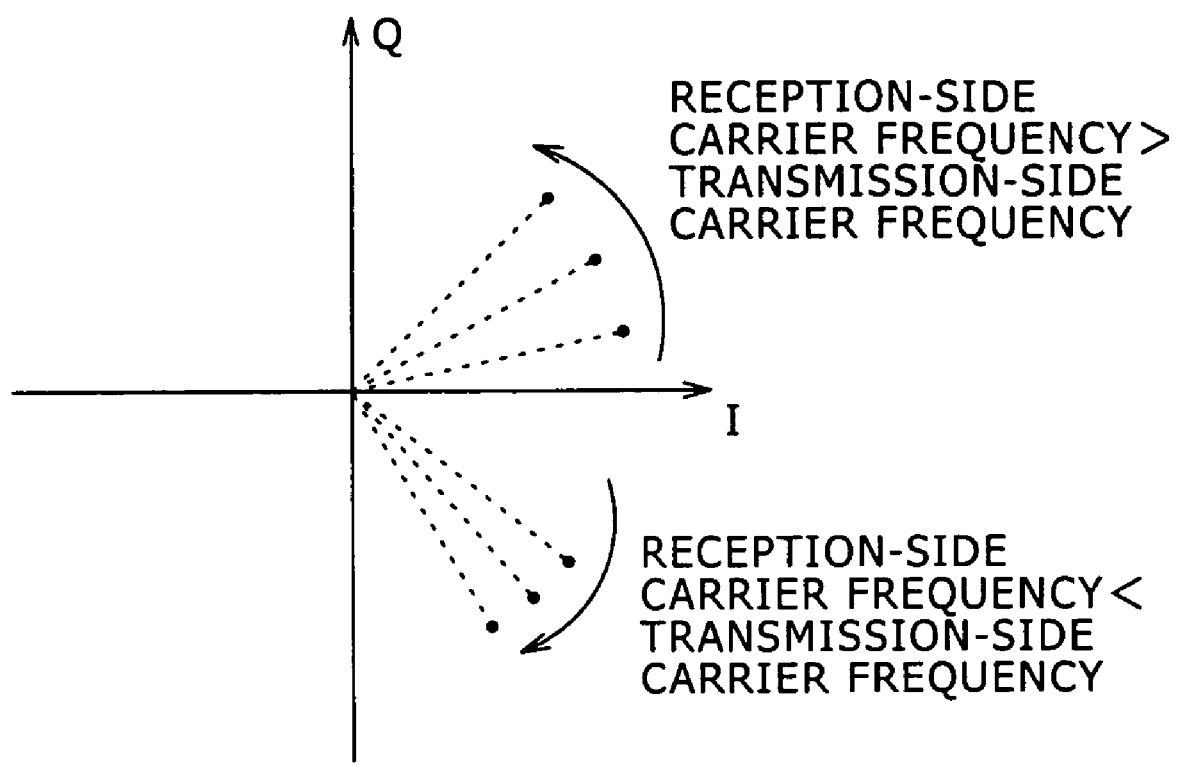
FIG. 9 is a drawing showing carrier phase errors on the IQ plane.

FIG. 9 shows carrier phase errors on the IQ plane. As is apparent from the figure, carrier phase errors are observed as unidirectional rotation. In the example shown in the figure, a carrier phase error is rotated as follows: when a received carrier frequency is larger than a transmitted carrier frequency, it is rotated counterclockwise on the IQ plane; when a received carrier frequency is smaller than a transmitted carrier frequency, it is rotated clockwise on the IQ plane.

Thus, the phase error detection & channel response rotation unit 22 obtains a phase error estimation value $(P_{err\_I}, P_{err\_q})$ by mapping the result of RAKE reception, carried out based on propagation path measurement values, onto the IQ plane.

Figure 10:
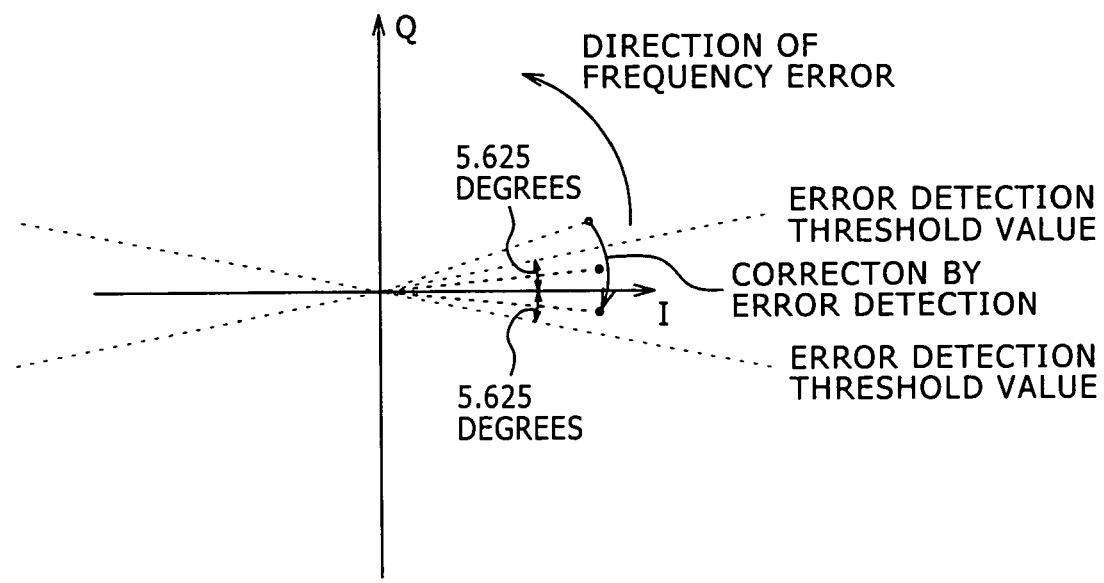
FIG. 10 is a drawing illustrating the operation performed by a phase error detection & channel response rotation unit 22 when a carrier phase error exceeds 5.625 degrees.

The phase error detection & channel response rotation unit 22 is provided with a function of detecting that the carrier phase error exceeds 5.625 degrees on the IQ plane. FIG. 10 illustrates the operation performed by the phase error detection & channel response rotation unit 22 when the carrier phase error exceeds 5.625 degrees. In the example shown in the figure, the propagation path estimation value and the carrier phase error estimation value $(P_{err\_I}, P_{err\_q})$ are rotated by 11.25 degrees in the direction opposite that of the phase error. As a result, the phase errors of carriers can be nestled within the range of ±5.625 degrees. Thus, substantially all the carrier tracking processing can be performed with a baseband processing unit constructed of a digital circuit. Therefore, it may be unnecessary to carry out carrier frequency control in an RF circuit.

The phase error detection & channel response rotation unit 22 carries out phase correction on a propagation path estimation value and a carrier phase error estimation value $(P_{err\_I}, P_{err\_q})$ and simultaneously performs the following operation: an internal counter (not shown) is incremented by −1 when the direction of phase correction is positive and +1 when it is negative. When the positive or negative phase error value on the counter becomes ±15 or ±16, t can be considered that ±180 degrees of phase shift in total have been observed up to now. This corresponds to a receive signal position error equivalent to 1/8 chip. Consequently, the phase error detection & channel response rotation unit 22 transmits a phase shift command to the RF processing unit so as to correct the chip position of the carrier signal by an amount equivalent to 1/4 chip in the direction opposite that of the observed phase shift.

The oscillator in the RF processing unit is provided with a mechanism to change the chip timing, that is, the phase in chip from 0/4 to 2/4 in response to a phase shift command from the baseband processing unit. This makes it possible to change the timing of A-D conversion and correct the phase of the RF processing unit by 1/4 (mentioned above).

The carrier tracking unit repeatedly performs the above-mentioned operation until RAKE reception is terminated.

Figure 11:
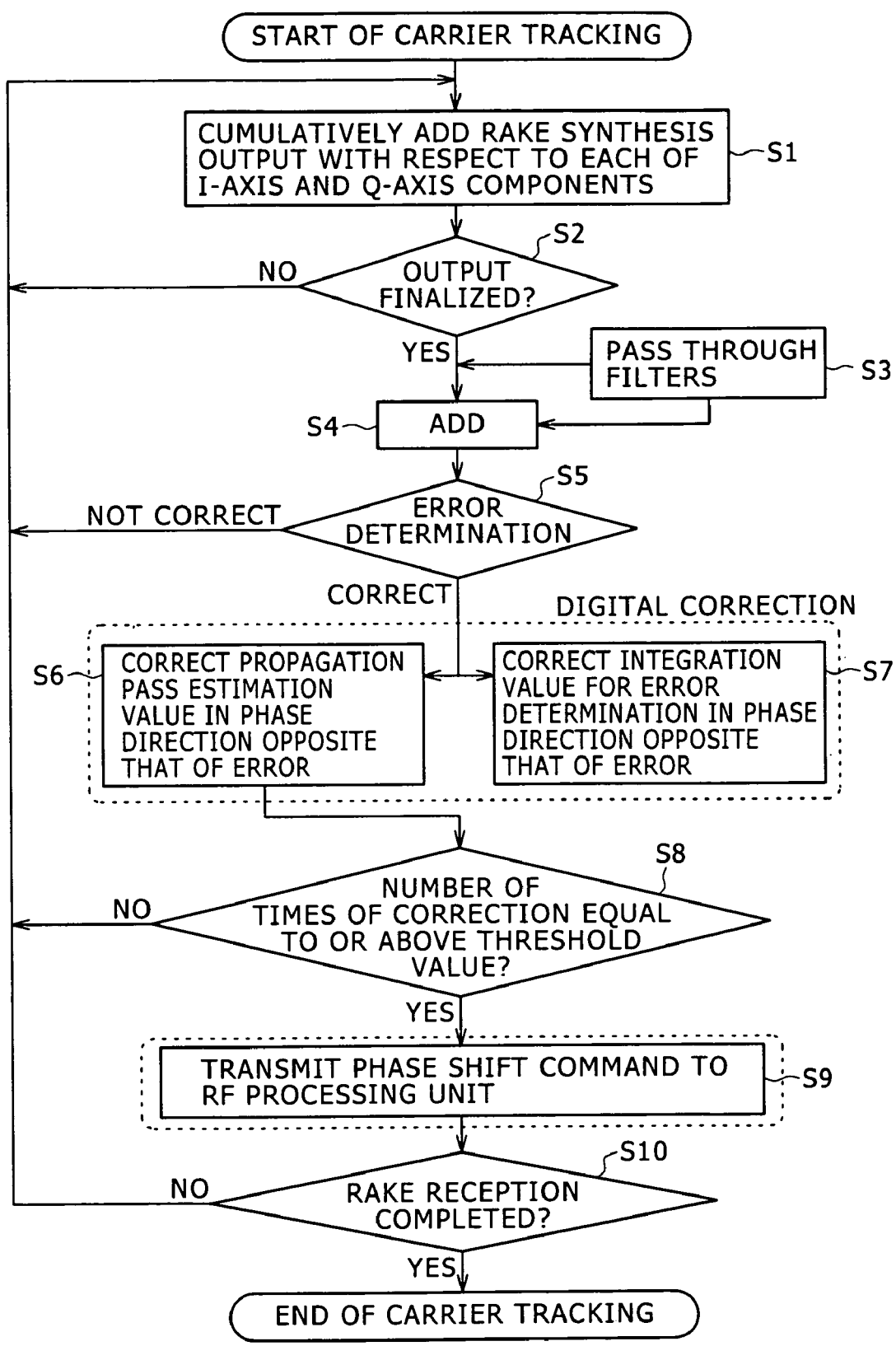
FIG. 11 is a flowchart illustrating the operating procedure for carrier tracking and phase correction.

FIG. 11 illustrates the operating procedure for carrier tracking and phase correction according to this embodiment in the form of flowchart.

The output of the RAKE synthesis unit 14 is cumulatively added with respect to each of the I-axis and Q-axis components (Step S1) until the output is finalized (Step S2). With respect to the I-axis component, its absolute values are added. With respect to the Q-axis component, the polarity is inverted before its values are added when the polarity of the corresponding I-axis component is negative. Thus, the operation corresponding to that all the receive signal points are gathered on the plane of I>0 is performed.

After the output of the RAKE synthesis unit 14 is finalized, the integration values of the I-axis and Q-axis components are outputted in accordance with the next ticking of the clock of the data enable signal from the RAKE synthesis unit 15. They are added together with the phase error estimation value $(P_{err\_I}, P_{err\_q})$ that are passed through the filters (Step S3) (Step S4).

As seen on the IQ plane, carrier phase errors are observed as unidirectional rotation. That is, a carrier phase error is rotated counterclockwise on the IQ plane when a received carrier frequency is larger than a transmitted carrier frequency; it is rotated clockwise on the IQ plane when a received carrier frequency is smaller than a transmitted carrier frequency.

Next, any error in the obtained carrier phase is determined (Step S5). In this embodiment, error determination is carried out according to whether the carrier phase error exceeds 5.625 degrees on the IQ plane or not.

Where the carrier phase error exceeds 5.625 degrees on the IQ plane, digital correction is made to the phase error in the baseband processing unit 10. Specifically, the propagation path estimation value is rotated by 11.25 degrees in the phase direction opposite that of the carrier phase error (Step S6). At the same time, the cumulative phase error estimation value, that is, the integration value for error determination is rotated by 11.25 degrees in the direction opposite that of the carrier phase error (Step S7). As a result, the phase errors of carriers can be nestled within ±5.625 degrees. Thus, substantially all the carrier tracking processing can be performed with a baseband processing unit constructed of a digital circuit. Therefore, it may be unnecessary to carry out carrier frequency control in an RF circuit.

When phase correction is made to the propagation path estimation value and the carrier phase error estimation value ($P_{err\_I}$, $P_{err\_q}$), the following operation is simultaneously performed: a counter is incremented by −1 when the direction of phase correction is positive and +1 when it is negative. When the number of times of correction up to now becomes equal to or exceeds a predetermined threshold value, it can be considered that ±180 degrees of phase shift in total have been observed up to now. Specifically, when the positive or negative phase error value becomes ±15 and the counter count becomes ±16, this consideration can be made. This corresponds to a reception position shift equivalent to 1/8 chip.

In such a case, analog carrier phase correction is started in place of the above-mentioned digital carrier phase correction. Specifically, a phase shift command is transmitted to the RF processing unit so as to correct the chip position of the carrier signal by an amount equivalent to 1/4 chip in the direction opposite that of the observed phase shift (Step S9).

The oscillator in the RF processing unit is provided with a mechanism to change the chip timing, that is, the phase in chip from 0/4 to 2/4 in response to a phase shift command from the baseband processing unit. This makes it possible to change the timing of A-D conversion and correct the phase of the RF processing unit by 1/4 (mentioned above).

The above-mentioned operation is repeatedly performed until RAKE reception is terminated (Step S10).

According to an embodiment of the present invention, as described up to this point, highly accurate carrier tracking can be implemented. Substantially all the carrier tracking processing can be performed with a baseband processing unit constructed of a digital circuit. Therefore, it may be unnecessary to carry out carrier frequency control in an RF circuit.

According to an embodiment of the present invention, carrier tracking is carried out by changing the timing of A-D conversion in an RF circuit when a phase error is large. Therefore, such a highly accurate oscillator as VC-TCXO (Voltage Controlled-Temperature Compensated Crystal Oscillator) may not be required. As a result, an RF circuit can be more simply incorporated into a receiver, and further reduction in power consumption can be accomplished.

Up to this point, the present invention has been described in detail with reference to a specific embodiment. However, it is apparent that those skilled in the art can made modification to or substitution for the embodiment without departing from the spirit and scope of the present invention.

This specification describes the present invention with focus upon an embodiment in which a spectrum is spread and ultra wideband communication is applied. The scope of the present invention is not limited to this, and the present invention can be similarly embodied in a communication method in which ordinary spread spectrum is carried out, needless to add.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication device including an RF processing unit, a baseband unit that carries out carrier tracking based on a signal after RF processing, and a propagation path estimating unit that estimates propagation paths based on a signal after RF processing, the wireless communication device comprises:

a phase error measuring means that measures a phase error estimation value composed of the phase error value of a carrier and the direction thereof; and a phase error correcting means that compares a phase error estimation value with a first threshold value and a second threshold value larger than the first threshold value, and carries out a first or a second phase error correcting process in response to the phase error estimation value exceeding the first or second threshold value, wherein the phase error correcting means rotates a propagation path estimation value by a predetermined value in the direction opposite the direction of a phase error in response to the phase error estimation value exceeding the first threshold value.

2. The wireless communication device according to claim 1 further comprising a RAKE synthesis unit that carries out RAKE reception based on the result of measurement by the propagation path estimating unit, wherein the phase error correcting means obtains a phase error estimation value ($P_{err\_I}$, $P_{err\_q}$) by mapping the result of RAKE reception, obtained by integrating I-axis and Q-axis components until the data output of RAKE synthesis is finalized, onto the IQ plane.

3. The wireless communication device according to claim 2, wherein the phase error correcting means rotates a phase error estimation value ($P_{err\_I}$, $P_{err\_q}$) by a predetermined value in the direction opposite the direction of a phase error on the IQ plane in response to the phase error estimation value exceeding the first threshold value.

4. A wireless communication device including an RF processing unit, a baseband unit that carries out carrier tracking based on a signal after RF processing, and a propagation path estimating unit that estimates propagation paths based on a signal after RF processing wherein the wireless communication device comprises:

a phase error measuring means that measures a phase error estimation value composed of the phase error value of a carrier and the direction thereof; and a phase error correcting means that compares a phase error estimation value with a first threshold value and a second threshold value larger than the first threshold value, and carries out a first or a second phase error correcting process in response to the phase error estimation value exceeding the first or second threshold value, wherein the phase error correcting means carries out the second phase error correcting process in response to the sum of the amounts of correction exceeding the second threshold value, the second phase error correcting process being carried out in response to a phase error estimation value exceeding the first threshold value.

5. A wireless communication device including an RF processing unit, a baseband unit that carries out carrier tracking based on a signal after RF processing, and a propagation path estimating unit that estimates propagation paths based on a signal after RF processing wherein the wireless communication device comprises:

a phase error measuring means that measures a phase error estimation value composed of the phase error value of a carrier and the direction thereof; and a phase error correcting means that compares a phase error estimation value with a first threshold value and a second threshold value larger than the first threshold value, and carries out a first or a second phase error correcting process in response to the phase error estimation value exceeding the first or second threshold value, wherein the phase error correcting means outputs a phase shift command to the RF processing unit in response to the phase error estimation value exceeding the second threshold value, and wherein the RF processing unit corrects the chip position of a carrier signal by a predetermined amount in the direction opposite the direction of a phase shift in response to a phase shift command.

6. A wireless communication method for carrying out carrier tracking based on a RF received signal, comprising:

measuring a phase error estimation value composed of the phase error value of a carrier and the direction thereof;

comparing a phase error estimation value with a first threshold value and carrying out a first phase error correcting process in response to the phase error estimation value exceeding the first threshold value;

comparing a phase error estimation value with a second threshold value larger than the first threshold value, and carrying out a second phase error correcting process in response to the phase error estimation value exceeding the second threshold value; and estimating propagation paths based on a signal after RF processing, wherein in the first phase error correcting process, a propagation path estimation value is rotated by a predetermined value in the direction opposite the direction of a phase error in response to the phase error estimation value exceeding the first threshold value.

7. The wireless communication method according to claim 6 further comprising: carrying out RAKE reception based on the result of measurement in the propagation path estimation, wherein in the first phase error correcting process, a phase error estimation value ($P_{err\_I}$, $P_{err\_q}$) is obtained by mapping the result of RAKE reception, obtained by integrating I-axis and Q-axis components until the data output of RAKE synthesis is finalized, onto the IQ plane.

8. The wireless communication method according to claim 7, wherein in the first phase error correcting process, a phase error estimation value ($P_{err\_I}$, $P_{err\_q}$) is rotated by a predetermined value in the direction opposite the direction of a phase error on the IQ plane in response to the phase error estimation value exceeding the first threshold value.

9. A wireless communication method for carrying out carrier tracking based on a RF received signal, comprising:

measuring a phase error estimation value composed of the phase error value of a carrier and the direction thereof;

comparing a phase error estimation value with a first threshold value and carrying out a first phase error correcting process in response to the phase error estimation value exceeding the first threshold value;

comparing a phase error estimation value with a second threshold value larger than the first threshold value, and carrying out a second phase error correcting process in response to the phase error estimation value exceeding the second threshold value; and estimating propagation paths based on a signal after RF processing, wherein the second phase error correcting process is carried out in response to the sum of the amounts of correction, exceeding the second threshold value, the second phase error correcting process being carried out in response to a phase error estimation value exceeding the first threshold value.

10. A wireless communication method for carrying out carrier tracking based on a RF received signal, comprising:

measuring a phase error estimation value composed of the phase error value of a carrier and the direction thereof;

comparing a phase error estimation value with a first threshold value and carrying out a first phase error correcting process in response to the phase error estimation value exceeding the first threshold value;

comparing a phase error estimation value with a second threshold value larger than the first threshold value, and carrying out a second phase error correcting process in response to the phase error estimation value exceeding the second threshold value; and estimating propagation paths based on a signal after RF processing, wherein in the second phase error correcting process, a phase shift command to correct the chip position of a carrier signal by a predetermined amount in the direction opposite the direction of a phase shift in RF processing in response to the phase error estimation value exceeding the second threshold value.

* * * * *